United States Patent [19]

Myers et al.

[11] Patent Number: 4,810,519

[45] Date of Patent: Mar. 7, 1989

[54] NON-AQUEOUS PROCESSING OF RICE

[75] Inventors: Marshall J. Myers, Houston, Tex.; Lester A. Brooks, Greenville, Miss.; Jerry Opella; Clifford Campbell, both of Houston, Tex.

[73] Assignee: Uncle Ben's Inc., Houston, Tex.

[21] Appl. No.: 898,236

[22] Filed: Aug. 20, 1986

[51] Int. Cl.$^4$ .............................................. A23L 1/182
[52] U.S. Cl. ...................................... 426/618; 426/460
[58] Field of Search ............... 426/618, 619, 425, 426, 426/429, 436, 439, 459, 450, 302, 303, 309, 460

[56] References Cited

U.S. PATENT DOCUMENTS

| | | | |
|---|---|---|---|
| 2,616,808 | 11/1952 | Roberts | 426/439 |
| 3,532,508 | 10/1970 | Ott | 426/618 |
| 3,582,352 | 6/1971 | Yasumatsu et al. | 426/618 |
| 3,600,192 | 8/1971 | Tanaka | 426/618 |
| 3,706,573 | 12/1972 | Tolson | 426/618 |
| 3,828,017 | 8/1974 | Fenley et al. | 426/436 |
| 3,870,804 | 3/1975 | Tolson | 426/618 |
| 3,914,454 | 10/1975 | Takatsu et al. | 426/309 |
| 4,649,055 | 3/1987 | Kohley | 426/449 |

FOREIGN PATENT DOCUMENTS

| | | | |
|---|---|---|---|
| 6054650 | 3/1950 | Japan . | |
| 48-2781 | 1/1973 | Japan | 426/618 |
| 56-43332 | 10/1981 | Japan | 426/618 |
| 57-86261 | 5/1982 | Japan | 426/618 |
| 59-11169 | 1/1984 | Japan | 426/618 |
| 59-78656 | 5/1984 | Japan | 426/618 |
| 164431 | 8/1985 | Japan | 426/618 |

OTHER PUBLICATIONS

Hackh's Chemical Dictionary, 3rd Edition, Julius Grant, Editor, p. 441 (New York 1944).

Primary Examiner—Donald E. Czaja
Assistant Examiner—Carolyn Paden
Attorney, Agent, or Firm—Curtis, Morris & Safford

[57] ABSTRACT

A process which comprises treatment of rice grains by contact with a non-aqueous media, organic liquid or liquified gas which is substantially inert to water and the rice grain being treated, permitting only the transfer of heat to effectuate desired food processing such as gelatinization, parboiling, cooking, frying, baking, roasting or the like, and a product made by that process.

37 Claims, No Drawings

NON-AQUEOUS PROCESSING OF RICE

FIELD OF THE INVENTION

The present invention relates to the non-aqueous processing of rice and, more particularly, to a process using a non-aqueous organic liquid or liquified gas as a heat transfer medium. By this invention, a wide spectrum of rice classes and varieties of paddy rice, brown rice and white rice can be suitably processed.

BACKGROUND OF THE INVENTION

In conventional rice processing the moisture content of the rice undergoing treatment is extremely important and must be carefully controlled to effectively gelatinize the rice starch present and to enhance overall processability and integrity of the rice product. Typically, the heat required to properly gelatinize and cook the rice is supplied to the rice through contact with excess water or steam. Exemplary of such a process is the conventional parboiling of rice.

The parboiling of rice is known to be a hydrothermic process by which desirable properties are imparted to the raw rice grain. One very important benefit of rice parboiling is in the resultant texture of the rice kernel which can be modified in such a way as to enable the consumer to obtain a finished, cooked rice product exhibiting a highly desirable texture. In some cases it is desirable to prepare rice which when cooked is firm but not sticky and is composed of separate grains. At other times, a different final texture may be desired. In all cases, however, the finished or cooked rice should substantially consist of intact kernels with little or no disintegrated or broken kernels.

Conventional rice parboiling processes typically include three basic steps; namely (1) soaking in water to obtain a stable moisture content (2) steaming, and (3) drying. The steaming or heat treatment step is conducted in the presence of water, steam or some other aqueous medium during which the rice is gelatinized. The moisture content of the rice starch prior to heat treatment together with the process conditions of temperature, pressure and heat transfer media are important factors in determining the level and effectiveness of gelatinization.

It should be appreciated that gelatinization of rice kernels is typically referred to as the irreversible swelling of the starch granules due to the effect of water and heat, resulting in loss of birefringence when observed under polarized light. Such gelatinization can be considered a melting process consisting of three basic steps; namely, (1) the diffusion of water into the starch granule (2) helix-coil transition of the starch molecule requiring varying levels of moisture and energy, and (3) swelling of the granules. It has been observed that gelatinization of starch is directly proportional not only to the moisture content of the rice grain prior to heat treatment, but also to the process temperature and process time. As the moisture content increases the amount of energy required to achieve a prescribed level of gelatinization decreases in terms of time and temperature. The higher the processing temperature the higher the level of gelatinization achieved for a given moisture content and process time. Correspondingly, the longer the process time above the minimum required moisture content and process temperature, the greater the degree of gelatinization.

Typically, at a moisture content below approximately 20%, the temperature necessary to effect gelatinization exceeds the temperature which causes carmelization or burning of the starch thereby negating any desired gelatinization effect. That is, when the process temperature exceeds approximately 140° C. The acceptable upper limit of moisture content can be determined by the amount of water that rice starch will absorb at a temperature below which no gelatinization occurs. For most typical rice grains this "soaking temperature" is below about 70° C. and rice starch will absorb moisture up to a maximum of about 50% water.

As one skilled in the art will appreciate, gelatinization of starch can be controlled to varying levels just as any chemical reaction can be controlled to any degree of completion. Gelatinization of starch, in the grain or as a free starch granule, is a first order chemical reaction. Accordingly, the gelatinization reaction is dependent upon the temperature at which the reaction is conducted, the time for which it is conducted and the concentration of water available for reaction. Thus, the degree of gelatinization can be controlled by varying the process time and temperature and the moisture content of the rice. As pointed out above, gelatinization has a very considerable impact on the subsequent processability and textural quality of the rice kernel. Thus, the ability to effectively control gelatinization and therefor the overall parboiling process is highly desirable.

It has also been found that heretofore known parboiling processes exhibit certain limitations or deficiencies. More particularly, paddy rice (that is, with the hull remaining on the rice grain) is typically used as the raw material for the parboiling process. The rice hull acts not only to prevent or minimize the escape of nutrients from within the rice kernels but also protects the rice grains against the detrimental effects of elevated temperatures and the steam processing environment required to gelatinize the starch granules.

While the known parboiling techniques continue to enjoy widespread acceptance and success in the processing of paddy rice, they are not suitable for use in connection with white rice or brown rice from which the hulls have been removed. In the conventional parboiling process, the use of steam has been found to cause the surface of both white and brown rice to become saturated with water thereby destroying the grain integrity and intactness and resulting in overprocessing of the grain surface. Such steaming (or even just prolonged soaking) causes process or heat damage and decreases product quality and yield to undesirable levels.

It can thus be readily appreciated that a real need exists for a process to treat a wide variety of rice grains including white and brown rice without experiencing the deleterious effects of conventional steam or aqueous processing. Such a process would confer on the art the significant advantage of increasing not only the effectiveness of known processes for the treatment of rice but would also permit the processing of certain classes, types and varieties of rice which heretofore have not been susceptible to parboiling or other treatment at elevated temperatures.

OBJECTS OF THE INVENTION

It is accordingly an object of the present invention to provide a method for the treatment of a wide variety of rice grains, specifically including white and brown rice, whereby the heat required to process the rice is transferred to the rice grain by a non-aqueous organic liquid or liquified gas.

It is another object of this invention to provide a method for the effective gelatinization and parboiling of paddy rice, brown rice and white rice.

It is still a further object of this invention to provide a product prepared by the method of this invention.

These and other objects and advantages of the present invention will become more readily apparent after consideration of the following.

GENERAL DESCRIPTION OF THE INVENTION

In its broadest aspect, the invention is directed to a process which comprises treatment of rice grains by contact with a non-aqueous media, organic liquid or liquified gas (preferably a hydrocarbon containing gas) which is substantially inert to water and the rice grain being treated permitting only the transfer of heat to effectuate desired food processing such as gelatinization, parboiling, cooking, frying, baking, roasting, etc. The particular non-aqueous media and processing conditions are selected depending upon the class, variety and type of rice grain being processed and the desired processing operation. Varieties of rice which may be used according to the invention include paddy rice, brown rice or white rice of long, medium or short grain and wild rice. In particular, the cultivars Newbonnet, Starbonnet, Lemont, Labelle and L202, all long grain varieties, may be used. Through careful selection and control of the moisture content of the rice grains prior to heat treatment and the temperature and pressure of the non-aqueous heat transfer media used, the degree of gelatinization and quality of the rice product is optimized. Further, by this invention a wide variety of rice grains are rendered suitable to parboiling.

The novel process of this invention provides the art with an opportunity to create unique new products of high textural quality from varieties of raw materials heretofore not suitable for certain processing. The use of a non-aqueous process media to provide the heat necessary to process white, brown and paddy rice is both novel and unexpected. Heat treatment of the rice by contact with a non-aqueous process media results in acceptable grain integrity even at relatively high moisture. The rice so treated is thereby rendered suitable as a parboiled rice or as a feed stock for instant or convenience rice processes.

As described above, the equilibrated moisture content of each kernel of rice is important and must be carefully maintained at a proper level prior to heat treatment. In the case of white rice, conventional steam processes do not permit proper control of the moisture level of the rice during heat treatment. This renders it virtually impossible to properly gelatinize or parboil white rice which, as one would expect, becomes sticky and unacceptable. By contrast, the process of the present invention uses a non-aqueous media to transfer heat to the rice grains without disturbing the critical moisture balance or destroying grain integrity. If the process proceeds under pressure, moisture contained in the grain will not vaporize, further maintaining the critical moisture level necessary to achieve the proper degree of gelatinization without subsequent or concomitant degradation of the rice kernel. By this process partial or complete gelatinization of the rice starch without significant adverse impact on yield or grain integrity is achieved. Such advantageous effects are not possible with heretofore known cooking or steaming operations.

In general, increased process time will increase the degree of gelatinization up to 100% gelatinization provided proper moisture content and temperature levels are maintained. For example, it has been found that 100% gelatinization can be achieved for rice at 24% moisture content using a process temperature of 130° C. for ten minutes. The process time can be reduced to four minutes if the moisture content is increased to say 30%. By using inert gases to over pressurize the process reactor, higher boiling point media can be used at the same moisture content and process temperature which can be used at lower pressures for lower boiling point media. By using various pressures at constant values of rice moisture, temperature and time, the effect of pressure may be studied. It has been found that the process pressure has a positive influence on the degree of gelatinization which can be achieved and on the overall flexibility of the process.

The raw material used has also been found to have an effect on the selection of process conditions. Paddy rice, brown rice and white (milled) rice of various varieties have been tested. The varieties having varying levels of amylose and amylopectin in the starch granules which influences the gelatinization temperature, are well known and reported in the literature. Preparation of the raw material influences the degree of gelatinization as it effects the ability of heat to transfer to the starchy portion of the rice kernel. Paddy rice (which includes the hull) shows a lesser degree of gelatinization for a given intermediate level of process conditions than white rice which achieves higher levels of gelatinization for a given set of process conditions. Brown rice has been found to be between white and paddy rice. For example, at a moisture content of 32%—10 minutes at 120° C. are required to achieve a gelatinization in the range of 80% to 85% for white rice. By comparison, a gelatinization in the range of 20% to 25% can be achieved with brown rice of the same variety and treated under the same process conditions.

The selection of the particular non-aqueous media used, is dependent primarily on the process temperature required. It has been found that effective non-aqueous media include organic liquids suitable for compression and use as a liquified gas in the processing of foodstuffs. More particularly, effectiveness has been shown for trichlorofluoromethane, trichlorotrifluoroethane, hexane, butane, rice bran oil, mineral oil and a blend of cottonseed and soybean oil.

DESCRIPTION OF CERTAIN PREFERRED EMBODIMENTS

In one embodiment of this invention, the following process steps are required to gelatinize the rice undergoing treatment. First, the raw rice sample is soaked or steeped in water and allowed to equilibrate to a desired predetermined moisture content. Typically, the rice is steeped at a temperature in the range of 55° C. to 60° C. for approximately 20 to 30 minutes. Excess water is then drained off and the rice is allowed to equilibrate for another 20 minutes or so. The moisture content at the end of such equilibration should be in the range of say 20–50% on a wet basis. It has been found that a moisture content of approximately 30% is particularly preferred.

The equilibrated rice is then placed into a pressure vessel which is then purged of air by the injection of a suitable gas such as nitrogen or carbon dioxide. A non-aqueous media such as liquified butane under pressure of say, 70 psig, is then injected into the pressure vessel.

The liquified butane and rice are heated in the vessel by suitable heating means to a process temperature in the range of 70° C. to 140° C. and a corresponding pressure in the range of 25 to 450 psig. The liquified butane is permitted to circulate within the vessel while maintaining the temperature and pressure for a time sufficient to achieve the desired level of gelatinization of the rice starch. The precise processing time and temperature are dependent upon the desired degree of gelatinization, the moisture content of the rice prior to the heat treatment and the particular raw rice sample being processed.

At the end of the processing time, the liquified butane is removed from the reactor and the vessel is in turn cooled, vented and flashed as necessary. At this stage of the process, the temperature and pressure of the reactor must be controlled to make certain that the water in the rice boils off properly. The reactor is again purged with nitrogen or carbon dioxide to eliminate residual butane gas and the vessel is then opened and the rice removed. The rice at this point is gelatinized and exhibits a free-flowing texture and desirable moisture content. The rice can then be dried as required at say 40° C. in two stages with tempering or it can be further processed into convenience rice products using other unit operations.

Various raw materials, moisture levels, non-aqueous media and process conditions have been evaluated to determine optimum materials and methods in accordance with the teaching of this invention. Certain of the specific parameters evaluated are discussed and set forth in the examples below.

Rough (paddy) samples of different rice varieties were obtained from various sources. Brown rice samples were prepared by removing the hulls from the paddy rice and white rice samples were prepared by milling the brown rice. The rice samples evaluated included long and medium types of white, brown and rough form. Among those varieties tested were Newbonnet, Lemont, Labelle and Starbonnet.

The non-aqueous media evaluated included organic liquids in the compressed and liquified state suitable for use in food processing. Specifically, trichlorofluoromethane and trichlorotrifluoroethane, liquified butane and hexane, rice bran oil, vegetable oil and mineral oil were tested.

To determine whether gelatinization occurred and to what extent, two known techniques described in the literature were used. The first involves measurement of the equilibrated moisture content ("EMC") which is the amount of water absorbed by the parboiled rice sample over a 24 hour period at room temperature and expressed as a percentage. It is noted that EMC is not a direct measurement of the degree of gelatinization as it is affected by the extent of retrogradation which the gelatinized starch undergoes during cooling and drying. However, highly gelatinized samples typically result in an EMC greater than 130, slightly gelatinized samples result in an EMC below 100, and intermediate levels of gelatinization result in EMC values between 100 and 130.

The second technique to detect and measure gelatinization is to view the rice under polarized light. Upon gelatinization, starch loses its birefringent ability and as a result the rice kernels will appear translucent under polarized light. Increased levels of translucent area indicate greater degrees of gelatinization. Values of "polarized scores" are described in the examples. Either technique can be used and both are included to demonstrate the effectiveness of using non-aqueous media to gelatinize rice of different varieties.

EXPERIMENTAL PROCEDURE FOR EXAMPLE 1 AS CONTROL

Approximately 1 kilogram of raw rice (long grain Newbonnet white rice) was added to distilled water which was then placed in a 3 quart stainless steel pot and heated on a stove to about 50° C. The rice was then allowed to soak (steep) for about 40 minutes. Following the soaking period, the rice was poured into a stainless steel strainer to remove excess water. It was then returned to the pot, covered, and allowed to equilibrate for about 40 minutes. The steeped and equilibrated rice was then placed in a 4 liter stainless steel pressure vessel to conduct the gelatinization reaction. The vessel was equipped with an externally controlled electric heating jacket and an internal stainless steel cooling coil (through which ambient cooling water was controllably circulated.) An internal thermocouple measured the temperature of the reaction mass and the heating and cooling was controlled by varying the electric heat and the cooling water flow.

Water, as a heating medium, was then placed into the reactor vessel at a weight to volume ratio of approximately 1:1. The vessel was then heated to 120° C. and maintained at 120° C. for about 30 minutes. At the end of the constant temperature holding time, the heat was turned off and water was circulated through the cooling coil to lower the temperature of the mixture of rice and water. The temperature of the mixture was reduced to about 30°-45° C. and the reactor was vented. Once atmospheric pressure was reached, the reactor was opened. The rice was observed to have "over-absorbed" water and suffered severe kernel damage. It was then removed from the reaction vessel and dried to a finished moisture content of about 10–15%. Upon cooking, the rice kernels were observed to be in a disintegrated state and not intact. The rice was viewed under polarized light and found to be nearly fully gelatinized. A tabulation of the process data for this example is contained in the table below.

COMPARATIVE EXAMPLES 2 THROUGH 13

The experimental procedure for examples 2 through 13 was conducted in the same manner as in example 1 with the only changes being in the raw materials, non-aqueous media, and process conditions used as indicated in the table below.

TABLE

Experimental Results for Examples 1-13

| Rice | | | | Reactor Conditions | | Polarized | Grain |
|---|---|---|---|---|---|---|---|
| Form | Type | Variety | Media | °C./min/PSIG | EMC | Score(c) | Integrity |
| White | Long | Newbonnet | Water | 120/30/30 | * | 5 | Disint. |
| Rough | Long | Newbonnet | Butane | 130/4/430 | 103 | 4 | Intact |
| Brown | Long | Newbonnet | Butane | 130/6/430 | 112 | 4 | Intact |
| White | Long | Newbonnet | Butane | 125/25/410 | 143 | 5 | Intact |
| White | Medium | Commercial | F113[b] | 120/26/160 | 258 | 5 | Intact |

TABLE-continued

Experimental Results for Examples 1–13

| Rice | | | | Reactor Conditions | | Polarized | Grain |
|---|---|---|---|---|---|---|---|
| Form | Type | Variety | Media | °C./min/PSIG | EMC | Score(c) | Integrity |
| White | Long | Sample Lemont | Butane | 130/26/460 | 128 | 5 | Intact |
| White | Long | Labelle | F11[a] | 125/10/260 | 134 | 5 | Intact |
| White | Long | Starbonnet | Butane | 130/28/444 | 148 | 5 | Intact |
| White | Long | Starbonnet | Vegetable Oil | 130/20/25 | 131 | 4 | Intact |
| White | Long | Starbonnet | F11 | 120/15/260 | 145 | 4 | Intact |
| White | Long | Starbonnet | F113 | 120/30/180 | 136 | 5 | Intact |
| White | Long | Starbonnet | Hexane | 120/30/80 | 166 | 5 | Intact |
| Brown | Long | Starbonnet | Rice oil | 160/6/255 | 129 | 3 | Intact |
| Brown | Long | Newbonnet | Mineral oil (USP grade) | 130/4/200 | * | * | Intact |

*Not measured
[a]F11 — Trichlorofluoromethane
[b]F113 — Trichlorotrifluoroethane
[c]Polarized Score values are as follows:
1 = completely opaque
2 = almost completely opaque (very little translucent area, mostly on the tip or outer portion of the grain)
3 = mixture; most grains opaque
4 = mixture; most grains with high degree of translucency
5 = almost completely translucent (very little opaque areas in the grain, mostly in the center)

All samples were found to be partially or fully gelantinized and all were found to yield intact kernels upon cook-up. The only example which did not yield intact kernels is Example 1 using water as the media.

The terms and expressions which have been employed herein are used as terms of description and not of limitation, and there is no intention in the use of such terms and expressions to exclude any equivalents of the features described or of portions thereof, its being recognized that various modifications are possible within the scope of the invention.

What is claimed is:

1. A method for gelatinizing rice which comprises the steps of:
    (a) hydrating a rice sample by steeping said rice sample in water at a temperature and for a period of time, said temperature and period of time being sufficient for said rice to obtain a desired moisture content which permits a desired degree of gelatinization of starch in said rice; and
    (b) heating said hydrated rice without steaming by contacting said hydrated rice under pressure for a period of time with a non-aqueous process medium heated to and maintained at a temperature, said period of time and temperature being sufficient for heat contained in said process medium to be transferred to said rice in order to effect said desired degree of gelatinization of said starch, said process medium being suitable for use in food processing and comprising a non-aqueous organic liquid or liquified gas which is substantially inert to water.

2. The method of claim 1 wherein the rice sample is hydrated to a moisture content in the range of 20% to 50%, by weight.

3. The method of claim 1 wherein the rice sample is hydrated to a moisture content of 30% to 40%.

4. The method of claim 1 wherein the rice sample is hydrated to a moisture content of about 30%.

5. The method of claim 1 wherein the process medium is maintained at a temperature in the range of 110° C. to 170° C.

6. The method of claim 1 wherein the process medium is maintained at a temperature in the range of 120° C. to 130° C.

7. The method of claim 1 wherein said process medium is a liquified hydrocarbon gas or liquid hydrocarbon, for use.

8. The method of claim 7 wherein said process medium is liquified butane or hexane.

9. The method of claim 7 wherein said process medium is liquified trichlorofluoromethane or trichlorofluoroethane.

10. The method of claim 7 wherein said process medium is liquid rice bran oil.

11. The method of claim 7 wherein said process medium is liquid vegetable oil.

12. The method of claim 7 wherein said process medium is liquid mineral oil.

13. The method of claim 1 wherein said rice sample is a variety of paddy rice, brown rice or white rice of long, medium, or short grain or wild rice.

14. The method of claim 13 wherein said rice sample is selected from the group consisting of Newbonnet paddy rice, Starbonnet brown rice, Lemont brown rice and L202 brown rice.

15. The method of claim 13 wherein said rice sample is a mixture of Lemont and L202 brown rice in a 1:1 weight ratio.

16. The method of claim 13 wherein said rice sample is selected from the group consisting of Starbonnet white rice, Newbonnet white rice and Lemont white rice.

17. The method of claim 1 wherein the period of time to effect said desired degree gelatinization is in the range of four to thirty-two minutes.

18. The method of claim 1 wherein said rice sample is gelatinized at least 40%.

19. The method of claim 18 wherein the rice sample is hydrated to a moisture content in the range of 20% to 50%, by weight.

20. The method of claim 19 wherein the rice sample is hydrated to a moisture content of 30% to 40%.

21. The method of claim 19 wherein the rice sample is hydrated to a moisture content of about 30%.

22. The method of claim 19 wherein the process medium is maintained at a temperature in the range of 110° C. to 170° C.

23. The method of claim 19 wherein the process medium is maintained at a temperature in the range of 120° C. to 130° C.

24. The method of claim 19 wherein said process medium is a liquified hydrocarbon gas or liquid hydrocarbon, for use.

25. The method of claim 24 wherein said process medium is liquified butane or hexane.

26. The method of claim 25 wherein said process medium is liquified trichlorofluoromethane or trichlorofluoroethane.

27. The method of claim 24 wherein said process medium is liquid rice bran oil.

28. The method of claim 24 wherein said process medium is liquid vegetable oil.

29. The method of claim 24 wherein said process medium is liquid mineral oil.

30. The method of claim 19 wherein said rice sample is a variety of paddy rice, brown rice or white rice of long, medium, or short grain or wild rice.

31. The method of claim 30 wherein said rice sample is selected from the group consisting of Newbonnet paddy rice, Starbonnet brown rice, Lemont brown rice and L202 brown rice.

32. The method of claim 30 wherein said rice sample is a mixture of Lemont and L202 brown rice in a 1:1 weight ratio.

33. The method of claim 30 wherein said rice sample is selected from the group consisting of Starbonnet white rice; Newbonnet white rice and Lemont white rice.

34. The method of claim 19 wherein the period of time to effect heat treatment is in the range of four to thirty-two minutes.

35. The method of claim 1 wherein said process medium is a non-aqueous organic liquid.

36. A method for heat treating rice undergoing food processing which comprises heating a hydrated, uncooked rice sample by contacting said rice sample under pressure for a period of time with a non-aqueous process medium heated to and maintained at a temperature, said period of time and temperature being sufficient for heat contained in said process medium to be transferred to said rice in order to effect a desired degree of gelatinization of said rice, said process medium being suitable for use in food processing and comprising a non-aqueous organic liquid or liquified gas which is substantially inert to water.

37. The method of claim 36 wherein said process medium is a non-aqueous organic liquid.

* * * * *

UNITED STATES PATENT AND TRADEMARK OFFICE
CERTIFICATE OF CORRECTION

PATENT NO. : 4,810,519

DATED : March 7, 1989

INVENTOR(S) : Myers, et al.

It is certified that error appears in the above-identified patent and that said Letters Patent is hereby corrected as shown below:

Column 8, line 28 (claim 7, line 3), after "carbon", delete ", for use";
Column 8, line 31 (claim 9, line 1), change "7" to -- 35 --;
Column 8, line 34 (claim 10, line 1), change "7" to -- 35 --;
Column 8, line 36 (claim 11, line 1), change "7" to -- 35 --;
Column 8, line 38 (claim 12, line 1), change "7" to -- 35 --;
Column 8, line 55 (claim 17, line 2), after "degree" insert -- of --;
Column 8, line 62 (claim 20, line 1), change "19" to -- 36 --;
Column 8, line 64 (claim 21, line 1), change "19" to -- 36 --;
Column 8, line 66 (claim 22, line 1), change "19" to -- 36 --;
Column 9, line 1 (claim 23, line 1), change "19" to -- 36 --;
Column 9, line 4 (claim 24, line 1), change "19" to -- 36 --;
Column 9, line 6 (claim 24, line 3), after "carbon", delete ", for use";
Column 9, line 10 (claim 26, line 1), change "25" to -- 36 --;
Column 9, line 13 (claim 27, line 1), change "24" to -- 37 --;
Column 9, line 16 (claim 28, line 1), change "24" to -- 37 --;
Column 9, line 18 (claim 29, line 1), change "24" to -- 37 --;
Column 9, line 20 (claim 30, line 1), change "19" to --36--; and
Column 10, line 8 (claim 34, line 1), change "19" to -- 36 --.

Signed and Sealed this

Tenth Day of October, 1989

*Attest:*

DONALD J. QUIGG

*Attesting Officer*   *Commissioner of Patents and Trademarks*